US006907646B2

(12) United States Patent
Lee et al.

(10) Patent No.: US 6,907,646 B2
(45) Date of Patent: Jun. 21, 2005

(54) SEATBELT BUCKLE APPARATUS (75) Inventors: Jae Ho Lee, Seoul (KR); Chan Woo Choi, Seong-Nam (KR)

(73) Assignee: Delphi Automotive Systems Sungwoo Corporation, Kangwon-do (KR)

( * ) Notice: Subject to any disclaimer, the term of this patent is extended or adjusted under 35 U.S.C. 154(b) by 0 days.

(21) Appl. No.: 10/666,522

(22) Filed: Sep. 22, 2003

(65) Prior Publication Data

US 2004/0107550 A1 Jun. 10, 2004

(30) Foreign Application Priority Data

Sep. 18, 2002 (KR) ................................ 10-2002-0057001
Sep. 18, 2002 (KR) ................................ 10-2002-0056992

(51) Int. Cl.[7] ......................... A44B 11/16; A44B 11/25; B60R 22/48
(52) U.S. Cl. ............................ 24/633; 24/634; 24/637; 24/640; 24/664; 180/268
(58) Field of Search .......................... 24/633, 634, 637, 24/636, 640, 664, 603

(56) References Cited

U.S. PATENT DOCUMENTS

| | | | | |
|---|---|---|---|---|
| 5,357,658 A | * | 10/1994 | Tanaka | 24/633 |
| 5,749,130 A | * | 5/1998 | Bilyeu et al. | 24/637 |
| 5,944,135 A | * | 8/1999 | Blackburn et al. | 180/268 |
| 6,076,239 A | * | 6/2000 | Kopetzky et al. | 24/633 |
| 6,427,297 B1 | * | 8/2002 | Yamaguchi et al. | 24/633 |
| 6,438,810 B2 | | 8/2002 | Rogers, Jr. et al. | |

FOREIGN PATENT DOCUMENTS

| | | |
|---|---|---|
| EP | 1 077 037 | 2/2001 |
| EP | 1 078 828 | 2/2001 |
| EP | 1078828 A1 * | 2/2001 |

* cited by examiner

*Primary Examiner*—Victor Sakran
(74) *Attorney, Agent, or Firm*—Jacobson Holman PLLC (57) ABSTRACT

A seatbelt buckle apparatus includes a buckle assembly for latching or unlatching a tongue connected to a seatbelt, a hall sensor assembly including contact and non-contact switched integrated into one unit, which is coupled with the buckle assembly, and for operating together with the buckle assembly to detect the locking or unlocking state thereof to generate at least two control signals; an upper case and a lower case coupled to each other for receiving the buckle assembly and the hall sensor assembly, in which the lower case includes a device for determining the position of the hall sensor assembly and fixing it thereon; the frame includes a device for determining the position of the hall sensor assembly and fixing it thereto; and an ejector including a second permanent magnet to cooperate with the hall sensor responsive to the movement thereof and a pair of leg portions projected from a lower surface thereof to cooperate with the movable member.

3 Claims, 5 Drawing Sheets

SEATBELT BUCKLE APPARATUS

BACKGROUND OF THE INVENTION

1. Field of the Invention

The invention is related to providing a seatbelt buckle mounted in a vehicle, and particularly, to providing a seatbelt buckle apparatus for receiving a multi-purpose buckle sensor assembly operated together to detect the locking state of the buckle.

2. Prior Arts

A conventional vehicle buckle is provided with a seatbelt, with which is mounted to a proper place in a vehicle. As being worn by an occupant, the seatbelt passes through and hangs on predetermined positions, for example three points, terminates into the buckle with a tongue connected to its end to be supported. The buckle is known to promote the safety of occupants in an abnormal condition.

The safety seatbelt buckle is supposed to identify on whether a driver and/or an occupant wears the seatbelt. The seatbelt buckle normally includes a mechanical switch such as a micro-switch to be operated with the tongue, together. Therefore, the micro-switch turns on or off in response to the insertion of the tongue thereinto, so that a warning lamp mounted on an instrument panel is lightened or put out to warn the non-wearing of the seatbelt for a driver and/or an occupant.

The safety seatbelt buckle further can include a non-contact switch such as a hall sensor to perform a self-diagnostic function of an electronic control unit such as ECU. Upon the seatbelt non-wearing of the occupant, the non-contact switch detects the abnormal states of the vehicle to force all warning lamps on the instrument panel to be lightened, while it enables the execution of the proper measures related to the traveling of the vehicle such as the limitation of a speed, the ready state for the operation of an airbag, etc. thereby enhancing the efficiency of a vehicle control.

But, the safety seatbelt buckle is configured so that the contact and/or non-contact switches are respectively or together mounted therein to recognize its locking state or non-locking state with being separated from each other. The configuration makes the mutual separated contact and non-contact switches mounted on their proper positions, mainly the bottom surface of a lower case, so the contact and/or non-contact switches are switched in response to the insertion of a tongue into the buckle in a predetermined lapse interval.

For example, a latch, an ejector or a moving member mounted in the buckle to be co-operated with the tongue operates these contact and/or non-contact switches. It means that their mounting place is limited and a separate mounting space is secured Furthermore, the configuration may cause the malfunction of the switches due to the wrongly insertion of the tongue into the buckle.

In order to resolve these problems, to a seatbelt buckle disclosed in European Patent Application EP1077037A2, a locking state detecting apparatus of a vehicle's buckle detected in European Patent Application EP1078828A1 can be adapted as follows:

The seatbelt buckle includes a body frame, a release button slidably coupled to the body frame for unlatching a seatbelt tongue from the seatbelt buckle, a locking lever capable of being pivotally rotated about wings by a predetermined angle, a slider for supporting and fixing the locking lever and an ejector for pushing the tongue in a longitudinal direction which is a lengthwise direction of the body frame. The body frame has an arch-shaped supporting beam which is integrally formed with the body frame in a manner such that the supporting beam is elected in a vertical direction. The supporting beam serves to limit movement of the slider and increase structural rigidity of the seatbelt of the seatbelt buckle. The slider has a width, which is greater than that of the body frame, and possesses shock-absorbing means for increasing durability of the seatbelt buckle. The release button has at least two release projections, which are formed with inclined surfaces that are in turn brought into contact with the inclined projections of the sliders.

In the seatbelt buckle, there may be mounted a locking state detecting apparatus of EP1078828A1, in which a contact switch and a non-contact switch are mounted on the inner right and left surfaces of the seatbelt buckle, respectively, adjacent to both sides of the body frame.

The seatbelt buckle is positioned in a lower case so that the tongue inserted is not escaped therefrom. For example, as the tongue is pushed into an inserting opening formed in the body frame, an ejector mounted in a slidably opening of a bottom plate is moved rearward. A locking lever, which is positioned on an upper end of the body frame and elastically supported by a spring, is rotated downward about wings to let a latch bar to be locked to the tongue.

At that time, the ejector forces ends projected from its both sides and out of the body frame to operate the contact and non-contact switches at once. The contact switch such as a micro-switch called "mechanical switch" is turned on to interrupt a power source applied to a warning lamp, so it means that the non-wearing of a seat belt is not warned for occupants. The non-contact switch such as a hall sensor assembly including a hall sensor and a permanent magnet is operated to detect the insertion of the tongue according to the approaching of the permanent close thereto, so that it supplies detecting signals to an electronic control unit (ECU) constituted as part of a vehicle control portion to perform the self-diagnostic function.

Nevertheless, the configuration shows that the contact and non-contact switches are mounted in the lower case to be separated from each other and their corresponding wirings are separated from each other. For it, their mounting is not easy and additional space for their mounting is required. t is difficult to mount the contact and non-contact switches at one place with a good space efficiency and operate them cooperating with the buckle.

Therefore, the configuration causes the contact and non-contact switches to have different operating time points, so it can't make an expression that they are operated with the buckle assembly at the same time. The configuration is not proper for a multi-purpose buckle sensor assembly to which the invention is adapted, which is integrated into one unit,. Herein, it is noted that the unified multi-purpose buckle sensor assembly enhances the self-diagnostic function of the electronic control unit in a vehicle.

SUMMARY OF THE INVENTION

Accordingly, an object of the invention is to provide a seatbelt buckle apparatus for receiving a multi-purpose hall sensor assembly therein that a contact switch and a non-contact switch are integrated into one unit to detect the locking state of a buckle assembly at the same time operating together therewith.

The other object of the invention is to provide a seatbelt buckle apparatus having an improved configuration for operating together with a multi-purpose hall sensor assembly that a contact switch and a non-contact switch are integrated into one unit to detect the locking state of a buckle at the same time.

According to the invention, a seatbelt buckle apparatus including a buckle assembly, in upper and lower cases of which upper and lower cases coupled to each other, a release button coupled to a frame for unlatching a locking bar of a locking lever from a tongue, an ejector elastically and movably supported in a slidable aperture for discharging the tongue latched to the locking bar out of outside responsive to the release button, the locking lever including a slider elastically and movably mounted on a guide surface thereof and for being pivoted at one end portion and latching/unlatching the tongue at the other end portion, a frame including a bottom plate on which the ejector is movable, front wall constituted as an arched supporting beam on which the slider is supported and side walls having an upper end portion on which the locking lever is pivotally rotated at its rear end, in which the seatbelt buckle apparatus are mounted, comprising;

a hall sensor assembly including a hall sensor portion containing a hall sensor and a printed circuit board electrically connected to the hall sensor in one package, a base plate electrical connected at one end portion to the printed circuit board and at the other end to a cable having control lines and power lines, on the upper surface of which a metal pattern is formed, with means for coupling with the frame, a movable member freely moving on the base plate with a first permanent magnet mounted at its center portion and a pair of contact terminals contacted with the metal pattern and a terminal block including the control lines and power lines contained therein and means for determining the position of the hall sensor assembly and fixing it in the lower case; the lower case including means for determining the position of the hall sensor assembly and fixing it thereon; the frame including means for determining the position of the hall sensor assembly and fixing it thereto; and the ejector including a second permanent magnet to be cooperated with the hall sensor responsive to the movement thereof and a pair of leg portion projected from a lower surface thereof to be cooperated with the movable member.

BRIEF DESCRIPTION OF THE DRAWINGS

The invention now will be described in detail with reference to the accompanying drawings, in which.

DETAILED DESCRIPTION OF THE INVENTION

Figure 1:
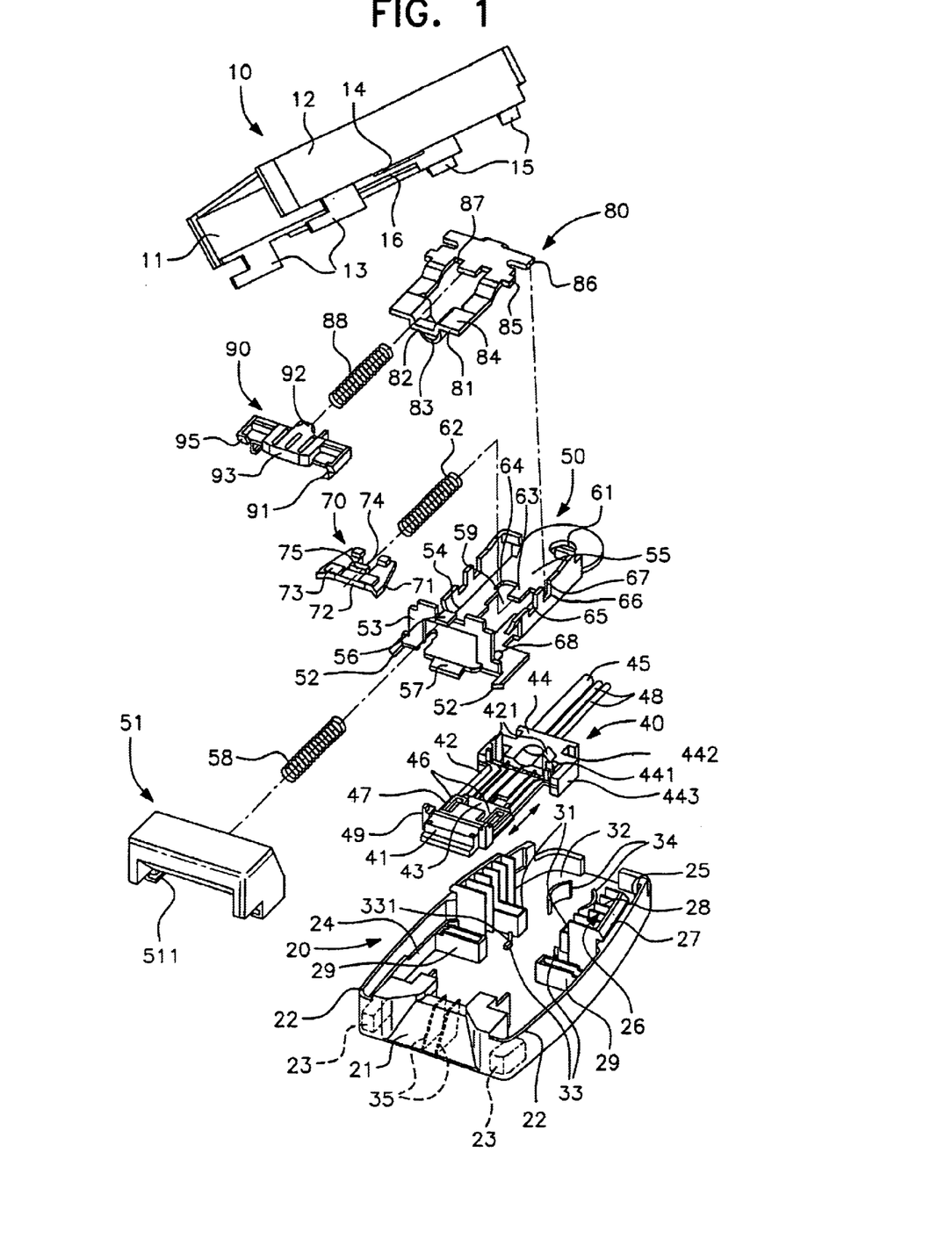
FIG. 1 is an exploded perspective view illustrating a seatbelt buckle apparatus including a hall sensor assembly mounted therein to be cooperated with a buckle assembly according to the invention.

Referring to FIG. 1, a seatbelt buckle apparatus 100 includes an upper case 10 and a lower case 20 containing a buckle assembly and a hall sensor assembly together with the uppercase 10

The lower case 20 receives the buckle assembly which includes a frame 50, a release button 51 fixed to the frame 50, an ejector 70 slidably mounted on a bottom plate of the frame 50, a locking lever 80 pivotally mounted on the upper portion of frame side walls to be coupled with a tongue and a slider 90 movable mounted on the locking lever 80, which are integrally assembled into each another.

First, the hall sensor assembly 40 will be explained for the purpose of helping the understanding of the invention. The ball sensor assembly 40 includes a hall sensor portion 41 packaged with a hall sensor and a printed circuit board, a base plate 42 including a metal pattern in a predetermined form fixed thereon and having a good electric conduction, a movable member 43 movably mounted on the base plate 42 with a pair of contact terminals being mounted on its lower surface to be contacted with the metal pattern and a terminal block 44 having control lines and power lines electrically coupled through the metal pattern to the base plate 42.

The hall sensor is coupled with the printed circuit board in one package, the control terminals of which are electrically connected to the printed circuit board. When the hall sensor is cooperated with a permanent magnet to generate control signals, the control signals are applied to at least one predetermined terminal of the metal pattern and then through a cable 45 having at least one control line to an electronic control unit. The power lines 48 are for positive and negative voltages to be supplied to a system, the power of which is used to lighten or put out a warning lamp mounted on an instrument panel according to the movement of the movable member 43 on the metal pattern.

The base plate 42 includes a positioning member 49 projected therefrom adjacent the front portion of the ball sensor portion 41 and a hook member 442 projected therefrom adjacent the front portion of the terminal block 44. The members 442 and 443 serves to determine the position thereof to the frame 40 as well as to allow the hall sensor assembly 40 to be coupled to the lower surface of the frame 50.

The movable member 43 includes a first permanent magnet 431 (referring to FIG. 3) mounted at its center, a pair of contact terminals 432 mounted on its lower surface facing to the metal pattern, a groove portion 46 formed adjacent both sides, into which a pair of leg portions are fitted, and a guider 47 formed to allow the movable member 43 to be moved on the base plate 42. Therefore, the movable member 43 enables the cooperating of the hall sensor with the first permanent magnet 431 and the selection of the contact terminals to predetermined terminals of the metal pattern to force the hall sensor to generate control signal for the electronic control unit and to perform the supply or interruption of the power to the warning lamp.

The upper case 10 is opened at its front surface and includes sidewalls 11 and 12 extended downward from the upper portion thereof. Clamps 13, a first supporting end portion 14 and a second supporting end portion 15 are formed projecting from the front, middle and rear of the sidewalls 11 and 12. A hook insert groove 16 is formed on the inner surface of the sidewalls 11 and 12. The lower case 20 is constructed to force the hall sensor assembly 40 to be positioned and received therein. A front wall 21 has a space (called "insertion opening" below) between a release button and it for the insertion of a tongue and clamp grooves 23 formed in corner portions adjacent the front wall for the fitting of the clamp 13 thereinto. Both sidewalls 22 includes first and second supporting grooves 24 and 25 respectively formed on the thickness thereof at the middle and rear ends corresponding to the first and second supporting end portions 14 and 15. A hook-fixing portion 26 is integrated on inner surfaces of both sidewalls 22 between the first and second supporting grooves 24 and 25 to be engaged with the hook grooves 16, respectively. The hook-fixing portion 26 includes a hook 27 positioned to have a height a little higher the sidewalls 22 at the upper end and a plurality of ribs 28 extended toward the inner portion of the lower case 20 to have at least one different width from each another in a group. A first supporting block 29 is integrally extended on a bottom 32 from the approximately middle portion of the sidewalls 12 to be positioned at the front surface of the terminal blocks 44 and contacted with the side of the base plate 42. The second supporting block 31 is extended on the bottom 32 from a pair of rib 28 having a smaller width to be fitted into the groove portion 442. The first and second supporting blocks 29 and 31 have a height equal to that of the terminal block 44 in the form of a rectangular body to reinforce the sidewalls 22 and the bottom 32.

On the bottom 32, a position determining projection 33 is formed to be fitted into the hole 441, which determines the mounting position of the hall sensor assembly 40 and prevents its rocking. Guide walls 34 are formed behind the second supporting block 31 on the bottom 32 in an are shape to be opposite to each other. A shoulder 331 having a little wider area is formed below the position determining projection 33 to support the base plate 42 contacting therewith.

Figure 2:
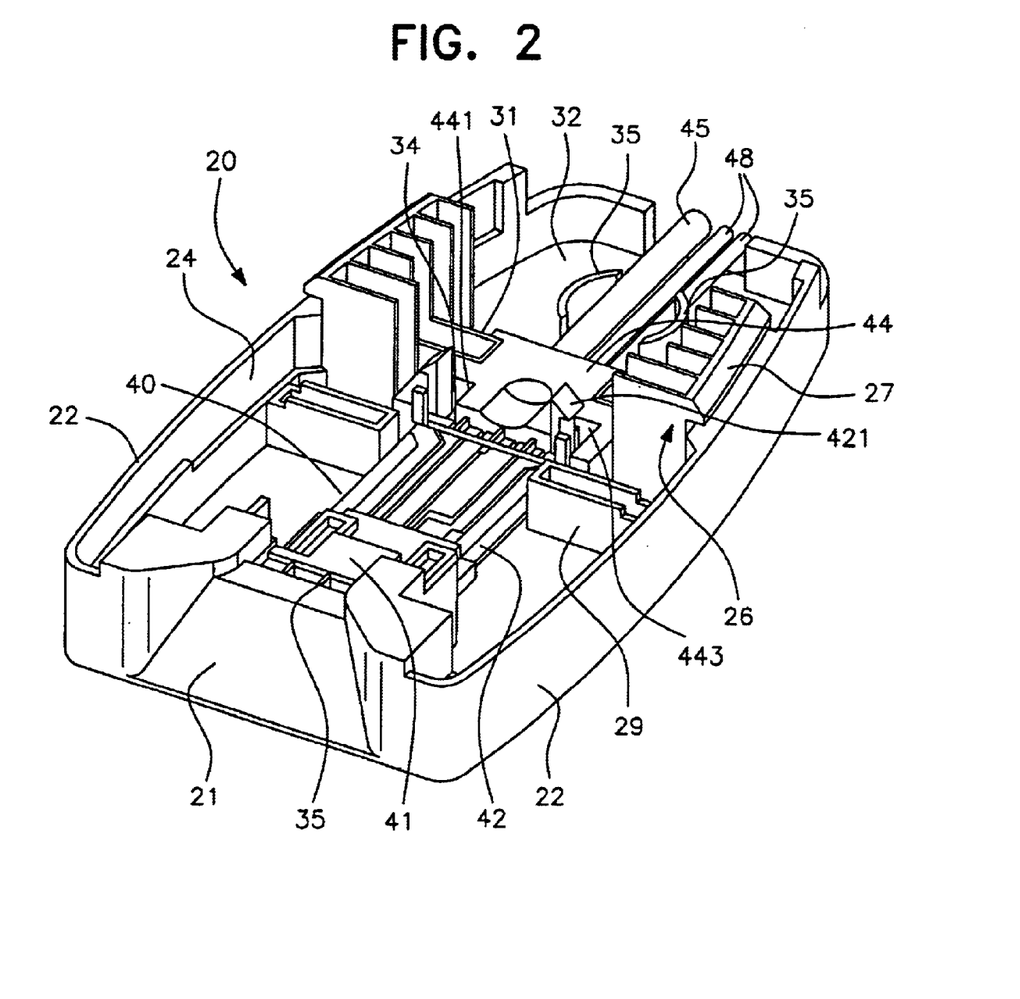
FIG. 2 is a perspective view illustrating an upper portion of a lower case in which a hall sensor assembly is mounted according to the invention.

Therefore, as shown in FIG. 2, when the upper case 10 is coupled with the lower case 20, the hall sensor assembly 40 is first positioned on the bottom 32. The hall sensor assembly 40 is positioned by the reference of the position determining projection 33 in a manner that the position determining projection 33 is fitted into the hole 441 of the terminal block 44 and its shoulder 331 is contacted with the lower surface of the base plate 42 to secure a predetermined gap between the bottom 32 and the base plate 42. At that time, the front end of the hall sensor portion 14 is supported contacting with the reinforcing ribs 35. The first supporting block 29 supports the base plate 42 contacting with both side surfaces of the base plate 42 adjacent the front-end portion of the terminal block 44, and the second supporting block 31 supports the terminal block 44 with its front end portion being fined into the groove 442. The control line cable 45 and power lines 48 connected to the terminal block 44 extend outside passing through the guide walls 34.

Additionally, the lower case 20 is coupled with the upper case 10 after the buckle assembly is coupled with the hall sensor assembly 40 to be cooperated with each other. For example, the clamp 13 is inserted into the clamp groove 23, and the first and second supporting end portions 14 and 15 are respectively contacted with the first and second supporting grooves 24 and 25 to be corresponded to each other. Next, the hook-fixing portion 26 serves to couple the lower case 20 with the upper case 10 in a manner that the first and second supporting end portions 14 and 15 are fitted into the first and second supporting grooves 24 and 25.

Returning to FIG. 1, the frame 50 is made of single metal plate materials and easily manufactured by a press, which is coupled with the release button 51. The frame 50 includes a hook portion 52 projected forward from the front portion of a lower plate 55, an arched supporting beam 53 vertically elected at the front portion, upstanding side walls 54 projected from both side ends thereof. The arched supporting beam 53 includes an opening at the center of its front surface, a first projecting piece 56 projected from the upper center thereof and a guide jaw 57 extended and bent downward from its front portion to guide the tongue thereinto. The release button 51 is coupled with the frame 50 in a manner that a first spring 58 is inserted onto the first projecting piece 56 at one end, and a hook of the hook portion 52 is passed through the guider 511 to allow the release button 51 to be moved on the hook portion 52.

Figure 4A:
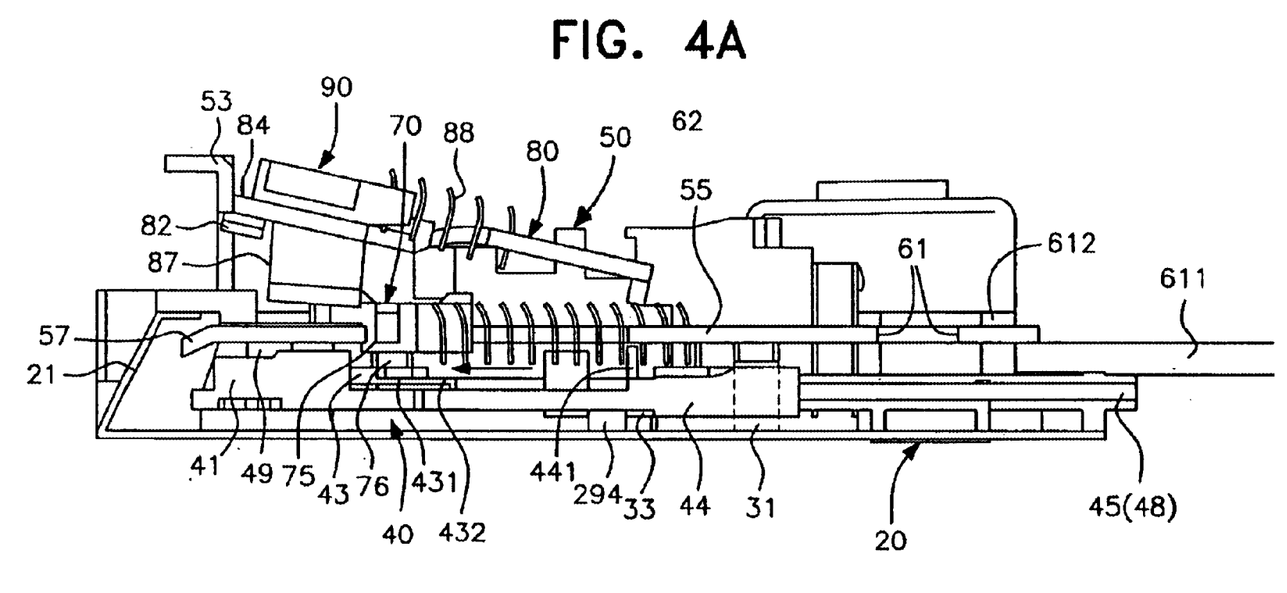

The lower plate 55 includes a sliding aperture 59 formed to move the ejector 70 along the lengthwise portion thereof and coupling hole 61 for mounting a connector 611 (referring to FIG. 4) therein by an anchor 612. A second projecting piece 63 is projected inward from the rear portion of the sliding aperture 59, and a coupling surface 64 is formed adjacent the rear portion of the sliding aperture 59 to be coupled with the hook 421 of the hall sensor assembly 40.

Figure 3:
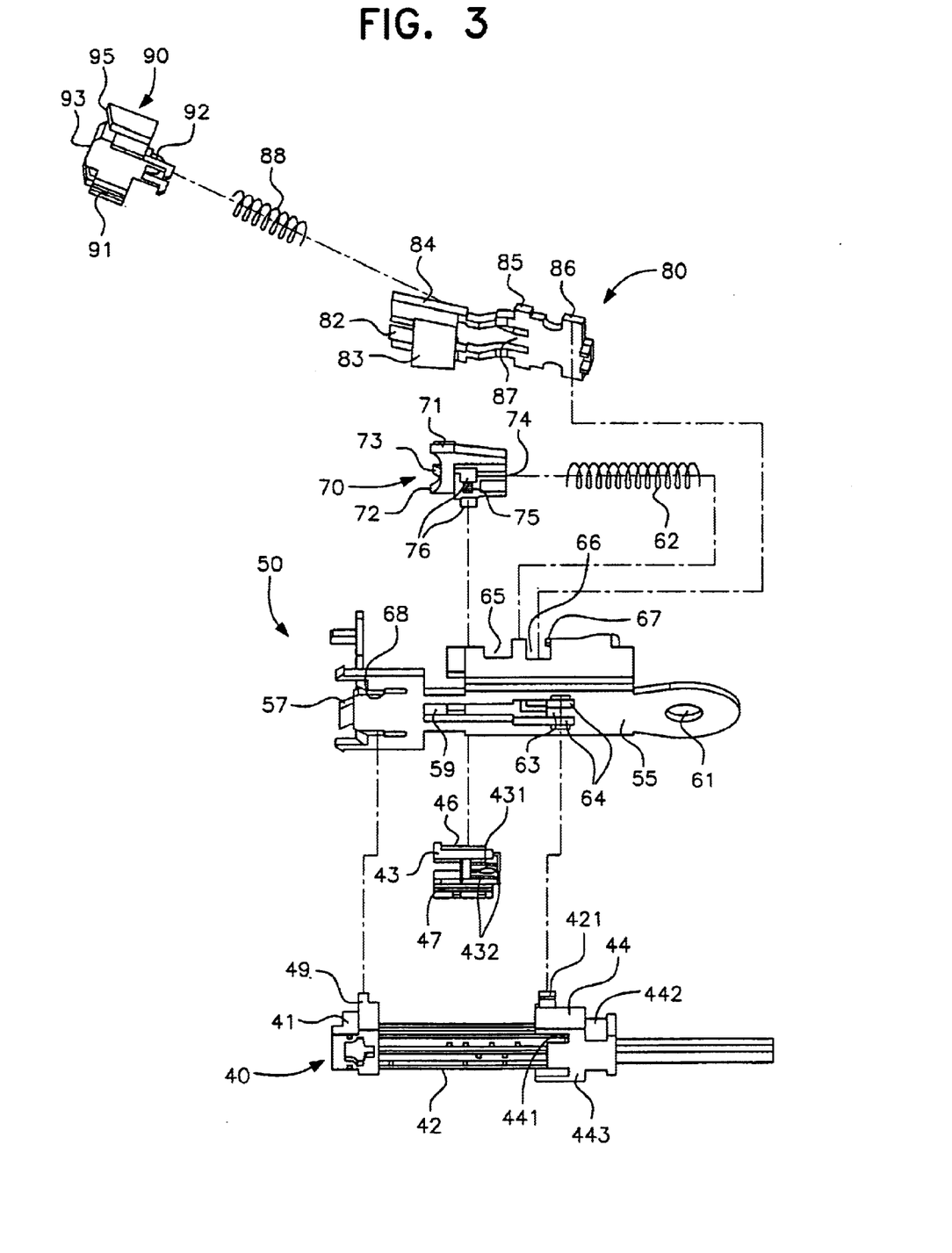
FIG. 3 is an exploded perspective view illustrating an improved configuration of a buckle assembly to be cooperated with a hall sensor assembly according to the invention; and, FIGS. 4A and 4B are cross-sectional views illustrating the operating of a hall sensor assembly mounted in a lower case operating together with a buckle assembly according to the invention.

The upstanding walls 54 include a stopper groove 65 and a hinge groove 66 formed at the rear portion of its upper portion, in which a hinge projection 67 is projected inward from the hinge groove 66 (referring to FIG. 3). A coupling groove 68 is formed behind the hook portion 52 on the bottom 32 to prevent the front portion of the hall sensor assembly 40 from being rocked.

The ejector 70 includes a guiding groove 71 formed on both side surfaces to allow a part of a lower plate 55 adjacent the sliding aperture 59 to be inserted thereinto, a contacting portion formed as a front surface in an arc shape to be contacted with a tongue and two separation-preventing portions 73 projected out of the front surface thereof to prevent the separating of the tongue contacted corresponding to the contacting portion 72. A receiving portion 74 is formed at the rear portion of the ejector 70 to receive the other end of the second spring 62 elastically supported in the sliding aperture 59. A second permanent magnet 75 is mounted on the center to cooperate with the hall sensor of the hall sensor portion 41. A pair of leg portions 76 is formed on the lower surface of the ejector 70 adjacent both guide grooves 71, which are fitted into the groove portions 46 to force the movable member 43 to be moved on the base plate 42 according to the movement of the movable member 43.

The locking lever 80 includes a coupling surface 83 coupling with the upper rear surface of the arched supporting beam 53, from the center of which a bending portion 82 is projected downward. A locking bar 83 is extended downward more than the bending portion 82 enough to be coupled with the tongue inserted into the insertion opening of the arched supporting beam 53. A guide surface 84 is extended rearward from the coupling surface 81 to form both side surfaces of the locking lever 80 and enable the slider 90 to be moved thereon. A stopper 85 and a hinge portion 86 are formed on the rear portion of the locking lever 80 to be respectively coupled into the stopper groove 65 and the hinge groove 66. An aperture is formed behind the guide surface 84 to mount a third spring 88 therein with one end being inserted into a third projecting piece 87. The third spring 88 is arranged on the aperture with the other end being coupled to the slider 90.

The slider 90 includes a guide rail 91 formed on the lower surface thereof to be movably inserted onto both end portion of the guide surface 84 and a fixing piece 92 formed on the rear portion thereof to be fixed to the other end of the third spring 88. The slider 90 is positioned on the guide surface 84 with the guide rail 92 being inserted into both side ends thereof and the third spring 88 elastically supporting the slider 90 between the third projecting piece 87 and the fixing piece 92. At that time, the slider 90 is contacted at the coupling surface 93 with the upper rear surface of the arched supporting beam 53 in an initial assembling state. The slider 90 further includes a hooked hanger 95 and is moved rearward along the guide surface 84 upon the backward motion of the ejector 70. At the same time the booked hanger 95 is moved downward with being hung on the front surface of the arched supporting beam 53, so that the contacting surface 93 is introduced into the aperture of the arched supporting beam 53.

As shown in FIG. 3, such like configuration is assembled to mount the hall sensor assembly 40 on the bottom of the frame 50 according to the invention. The position determining projection 33 on the bottom 32 of the lower case 20 is fitted into the hole 441 of the terminal block 44. The base plate 42 adjacent the front portion of the terminal block 44 is supported by the first supporting block 29, and the terminal block 44 having the groove portion 442 is supported by the second supporting block 31. The hall sensor portion 41 is supported by contacting the front portion thereof with the reinforcing ribs 35. Therefore, the buckle assembly can be coupled to the hall sensor assembly 41 upon being placed on the bottom 32.

On the other hand, the buckle assembly is assembled as follows: the ejector 70 is assembled to be electrically supported in the sliding aperture 59, whereby the guide grooves 71 are fitted into the lower plate 55 adjacent the sliding aperture 59 and the second spring 62 is arranged at one end to be coupled into the receiving 74 and at other end to be fitted into the second projecting piece 83.

Next, the slider 90 is assembled on the locking lever 80 in a manner to movably mount the guide rail 91 onto the side end portion of the guide surface 84 with the third spring 88 being elastically arranged between the fixing piece 92 and the third projecting piece 87. The locking lever 80 is mounted on the upper portion of the frame 50 so that the stopper 85 is inserted into the stopper groove 85 to prevent the advance thereof, and the hinge portion 86 is seated in the hinge groove 66 to pivotally rotate the locking lever 80 downward or upward about it. At that time, the hinge projection 67 prevents the accidental separation of the locking lever 80 out of the hinge groove 66.

In order to mount the buckle assembly on the hall sensor assembly 40 by the reference of the positioning member 49, the positioning member 49 is fitted into the coupling groove 68 and the leg portions 76 are coupled into the groove portions 46, respectively. The hook member 421 is engaged with the coupling surface 64 on the rear portion of the sliding aperture 58 on the lower plate 55. So, the hall sensor assembly 40 and the buckle assembly are mounted at the same time in the lower case 20.

Figure 4B:
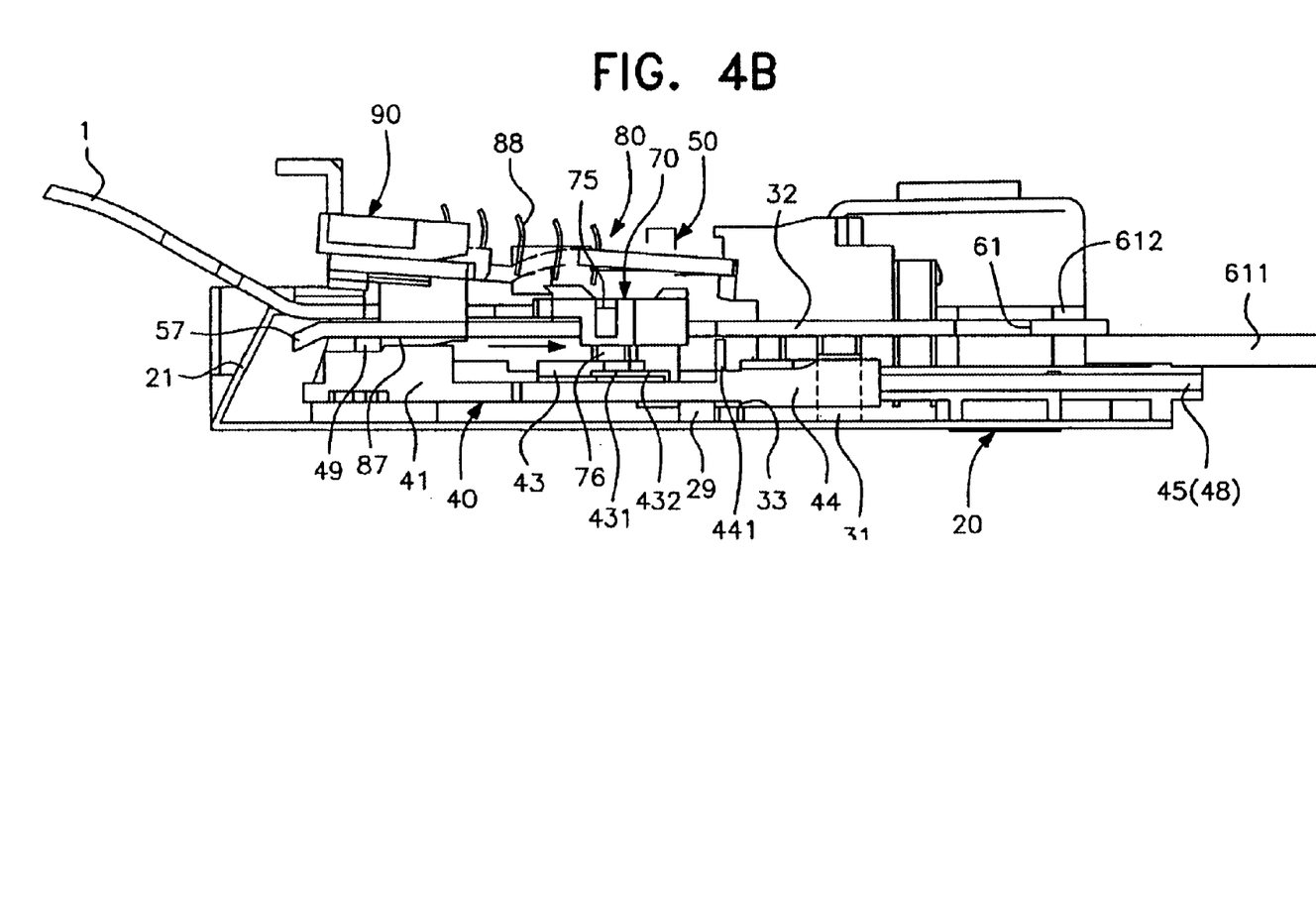

As shown in FIGS. 4A and 4B, in the lower case 20, a hall sensor assembly 50 is mounted on the bottom 32 so that a position determining projection 33 determines its mounting position by being fitted into a hole 441, a first supporting block 29 supports a base plate 42 and a second supporting block 31 supports a terminal block 44. A cable 45 having control lines and power lines are arranged between guide walls 34 to pass therethrough.

The buckle sensor assembly is associated with the hall sensor assembly 40 for their simultaneous operating. A guide jaw 57 is placed on the inner upper portion of a front wall 21. A positioning member 48 is fitted into a coupling groove 68 (referring to FIG. 1), a coupling surface 441 is engaged with a hook portion 441 and a connector 611 placed on a coupling hole 61 is fixed a bottom 32 by an anchor 612 to mount the buckle assembly in a vehicle. An ejector 70 is mounted in a sliding 59 so that a pair of leg portion 78 is respectively fitted into groove portions 46 to reciprocate a movable member 43 on a base plate 42.

Herein, it is noted that a first permanent magnet 431 leads to the operating of a hall sensor in a hall sensor portion 41 according to the movement of the movable member 43, so that a pair of contact terminals 432 selects predetermined terminals of a metal pattern to lighten or put out a warning lamp mounted on an instrument panel. An ejector 70 includes a second permanent magnet 75 at the center thereof, which is placed close to the hall sensor of the hall sensor portion 41 at an initial position along with a first permanent magnet 431.

Therefore, as shown in FIG. 4A, the buckle assembly is coupled with the hall sensor assembly 40 at first state, so that the first and second permanent magnets 431 and 75 are placed adjacent the hall sensor portion 41. In that case, a pair of contact terminal 432 forces a power source of power lines 48 to be applied to the warning lamp based on the metal pattern, thereby lightening it and warning the non-wearing of a seatbelt to occupants. At the same time, the hall sensor generates control signals to apply them through a cable 45 to an electronic control unit, so that other safety apparatuses such as an airbag system, etc. stand ready for corresponding safety operating.

As shown in FIG. 4B, as a tongue 1 is inserted into an insertion opening over a front wall 21, the ejector 70 is moved backward along with the movable member 43. The locking lever 80 is moved downward at the front-end portion thereof to insert the opening of the arched supporting beam 53. And then a locking bar 87 is inserted into a center aperture of the tongue 1 to lock it to the buckle assembly. Therefore, the first and second permanent magnets 431 and 75 are placed adjacent the hall sensor portion 41. Therefore, the first and second permanent magnets 431 and 75 are placed away from the hall sensor portion 41. The hall sensor generates another control signal to apply them through the cable 45 to the electronic control unit based on the metal pattern, so that other safety apparatuses such as an airbag system, etc. release the stand by state for corresponding safety operating. At the same time, the power source of the power line 48 is interrupted to put out the warning lamp, which represent the wearing of the seatbelt.

As described above, the invention enables the mounting of a hall sensor assembly in a case to enhance the space efficiency, and the operations of contact and non-contact switches happens simultaneously cooperating with each other.

We claim:

1. A seatbelt buckle apparatus with a buckle assembly including upper and lower cases coupled to each other, a release button coupled to a frame for unlatching a locking bar of a locking lever from a tongue, an ejector elastically and movably supported in an aperture for discharging the tongue latched to the locking bar responsive to the release button, the locking lever including a slider elastically and movably mounted on a guide surface thereof and being pivoted at one end portion and latching/unlatching the tongue at the other end portion, a frame including a bottom plate on which the ejector is movable, a front wall constituted as an arched supporting beam on which the slider is supported and side walls having an upper end portion on which the locking lever is pivotally rotated at its rear end, the seatbelt buckle apparatus comprising:

the lower case including a clamp groove into which a clamp of the upper case is inserted, first and second supporting grooves to which first and second supporting end portions are respectively coupled, and a hook-fixing portion serving to fit the first and second supporting end portions into the first and second supporting grooves to be coupled with the upper case;

the lower case receiving a hall sensor assembly therein and including a position determining projection formed to determine a mounting position and prevent rocking of the hall sensor assembly, a shoulder formed with a gap from a bottom to support the hall sensor assembly, a first supporting block integrally and inwardly extended from a middle portion of both sidewalls, a second supporting block integrally and inwardly extended from a pair of ribs having a smaller width to be fitted into a groove portion of the hall sensor assembly and guide walls formed behind the second supporting block in an arc share to be opposite to each other;

the hall sensor assembly being positioned on the bottom of the lower case and including a hall sensor portion containing a hall sensor and a printed circuit board electrically connected to the hall sensor in one package, a base plate electrically connected at one end portion to the printed circuit board and at the other end to a cable having control lines and power lines, on an upper surface of which a metal pattern is formed, with means for coupling with the frame, a movable member freely moving on the base plate with a first permanent magnet mounted at a center portion and a pair of contact terminals contacted with the metal pattern and a terminal block including the control lines and power lines contained therein and means for determining a position of the hall sensor assembly and fixing the hall sensor assembly in the lower case;

the fame including a coupling surface formed adjacent a rear portion of a sliding aperture thereof to be coupled with the hook of the hall sensor assembly and a coupling groove formed behind a hook portion thereof; and the ejector including a second permanent magnet to cooperate with the hall sensor responsive to the movement thereof and a pair of leg portions projected from a lower surface thereof to cooperate with the movable member.

2. The seatbelt buckle apparatus of claim 1, wherein:

the hall sensor portion includes a front portion coupled with the front wall of the lower case, the base plate includes a positioning member for determining the position to be coupled with the frame and a hook portion formed adjacent the terminal block to be coupled with the frame.

3. The seatbelt apparatus of claim 1, wherein:

any one of the first and second permanent magnets is used to cooperate with the hall sensor portion.

* * * * *